Jan. 4, 1944. E. C. HOGE 2,338,246
STRUCTURAL CEMENT SLAB
Filed June 27, 1941
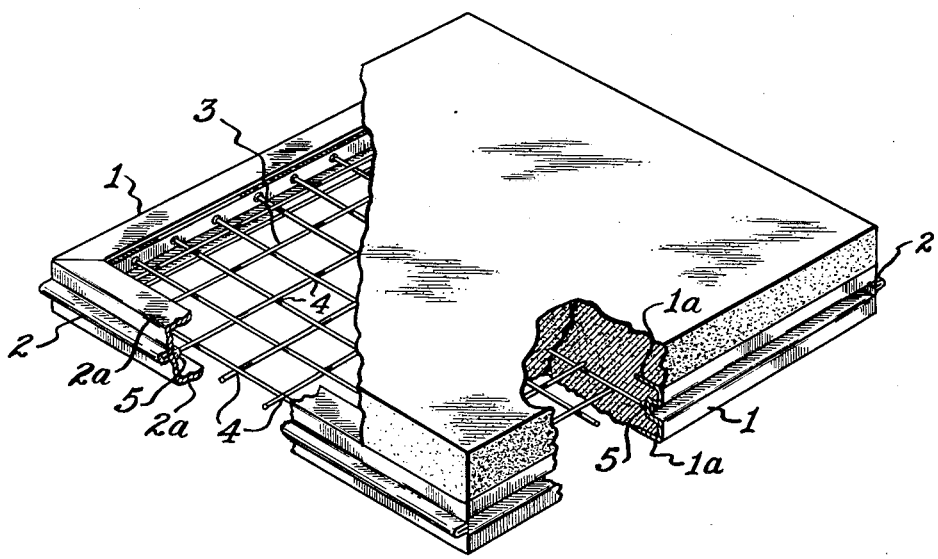
INVENTOR.
EDWARD CLYDE HOGE.
BY
ATTORNEYS.

Patented Jan. 4, 1944

2,338,246

UNITED STATES PATENT OFFICE 2,338,246

STRUCTURAL CEMENT SLAB

Edward Clyde Hoge, Cincinnati, Ohio

Application June 27, 1941, Serial No. 400,060

1 Claim. (Cl. 72—68)

There have been various suggestions of ways in which to make up a pre-cast cementitious slab which is reinforced for strength and which can be provided with groove and tongue joints so as to fit closely together with other slabs in forming a ceiling, wall, roof or floor.

The use of reinforcement in such slabs is limited by several factors, one of which is the weight thereof. It is my object to provide for maximum strength consistent with unusually light weight. In such slabs where metal edges are formed so as to give non-chipping interengaging surfaces in forming tongue and groove joints, the metal acts as a conductor of heat, and hence constitutes a zone of weakness surrounding each panel or slab in the insulation value thereof. Sweating is likely to occur at such metal portions. It is my object to provide a construction which is free of this defect.

In supplying reinforcement between metal edging pieces in such precast panels or slabs it has been suggested to extend rods across between the edge pieces and secure them in place by nuts at one end. Such a mode of reinforcement is not desirable or practical. It extends in but one direction, and the rods are not tightly bound to the side rails or channels constituting the edging pieces.

Furthermore, the presence of the rod heads and nuts at the ribbed portions and in the channels of the metal side rails interferes with a satisfactory tongue and groove joint.

It is my particular object to employ as a cementitious body extremely light mineral matter such as vermiculite together with a cementitious binder and water which requires heat and pressure to obtain a permanent set, and no previous frame or reinforcement with which I am familiar will be satisfactory as a reinforcement for such a slab because it will warp out of shape and split the slab during the treating.

According to my invention, I provide a precast slab in which I use channel and ribbed strips to provide for a suitable groove and tongue joint on all four sides, welded into a rigid form, and connect the metal chanels and rails together with a woven type of insulation formed of comparatively heavy wire or rods welded to each other at points where they cross in the mesh, and likewise, welded to the metal side pieces. The cementitious aggregate is cast within the frame formed by such a unitary welded structure, and extends above the level of the metal framing pieces, so that there is no metal exposed at both the top and the bottom of any panel.

This unitary welded structure permits the use of unusually light and highly insulating cementitious materials as the fill within same which forms the slab itself, yet furnishing adequate structural strength afforded by the unique arrangement of the supporting structure. As a result of my invention, I provide a structural member of adequate strength but of lighter weight and higher insulation value than anything yet known.

In the drawing I have illustrated a typical panel embodying my invention and I will describe the same in detail, reference being had to the accompanying claim for a statement of the novelty inherent in the illustrated example.

The drawing is a perspective partly broken away showing the structure.

In forming my panel I assemble together a pair of metal channels 1, 1 and a pair of ribbed bars 2, 2, the ribs of which act as tongues in the channels for tongue and groove joints between the final slabs. The channels and bars are welded together at the corners. They are flanged as at 1a and 2a.

I provide a wire open mesh reinforcing sheet formed of wires or thin rods 3, which are welded together at all intersections as at 4. I have found it practical to use 10 gauge wire. The ends of the wires or thin rods are butt welded to the channels and the ribbed bars, as indicated at 5. This thus forms a unitary frame and reinforcement.

Following this formation of a reinforced frame, I cast a slab, say of cementitious aggregate, more particularly the vermiculite and cement composition hereinabove referred to, which leaves the metal exposed around the bottom of the slab at the flanges 1a and 2a exposed. The upper flanges are, however, imbedded in the aggregate which rises above the flanges, thus insulating the metal from contact with the atmosphere on the one side of the finished slab. When using a cementitious body which requires heat and pressure to effect a rapid and permanent set, the slab is placed in a suitable autoclave which is placed under live 300° steam at around 75 pounds pressure. The steam pressure will no doubt be variable, dependent on the particular composition. The Rostone Co. of La Fayette, Indiana, has a process for forming artificial stone products which will serve for a cementitious mixture with vermiculite and a treatment thereof which is adequate for my purpose. However, other light weight cement and plaster bodies can be used, and the heat curing omitted or used as required for the particular substance.

In use, the slabs are mounted with tongue and joint connections in engagement. The edges which are not covered by metal can be either inside or outside of the structure, preferably outside, where the inside is subject to view of the occupants of the building.

The slab is light and strong. There is nothing to become loose in the reinforcement. Clean channels and ribs are provided for the joints. Reinforcement is present in every direction and there are no pieces of metal exposed on both surfaces of the slab to break down insulation value and be subject to sweating.

The shape of the slab, and the exact form of joint forming metal rails, and the exact nature of the mesh reinforcement are details which can be varied without departing from the spirit of my invention.

Having thus described a typical example of my invention, I set forth the novelty claimed to be inherent therein in the following claim:

A precast cementitious slab comprising a flanged metal frame formed of sections of channel and rib form providing for tongue and groove joints with companion slabs, said sections welded at the corners, a metal reinforcing mesh the strands of which are welded to said sections forming a unitary welded frame traversed by a welded in place metal mesh, and a body composed of heat and pressure consolidated vermiculite and binder enclosing said metal reinforcing mesh and enclosing one side flange of said frame and extending above the surface of said enclosed flange throughout the entire area of said slab forming an insulating partition throughout said area, the flange opposite said enclosed flange being exposed on its outer surface, said frame also having the outer surfaces thereof of channel and rib formation also exposed whereby said slab at one surface has metal flanges outlining its area, and at the other surface the vermiculite and binder extending throughout the area of said surface, with the outer surfaces of the channel and ribbed portion of the frame also exposed for forming metal to metal tongue and groove joints with companion slabs.

EDWARD CLYDE HOGE.